(12) United States Patent
Malik

(10) Patent No.: US 12,499,414 B2
(45) Date of Patent: *Dec. 16, 2025

(54) SYSTEMS AND METHODS FOR HISTORICAL MOTION AND/OR VIBRATION DETECTION IN VEHICLE GATEWAYS

(71) Applicant: Hilti Aktiengesellschaft, Schaan (LI)

(72) Inventor: Muhammad Salman Malik, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 530 days.

This patent is subject to a terminal disclaimer.

(21) Appl. No.: 17/934,331

(22) Filed: Sep. 22, 2022

(65) Prior Publication Data

US 2024/0104492 A1    Mar. 28, 2024

(51) Int. Cl.
*G06K 7/10* (2006.01)
*G06Q 10/087* (2023.01)

(52) U.S. Cl.
CPC ....... *G06Q 10/087* (2013.01); *G06K 7/10366* (2013.01)

(58) Field of Classification Search
CPC .......... G06Q 10/087; G06K 7/10366
See application file for complete search history.

(56) References Cited

U.S. PATENT DOCUMENTS

| | | | | |
|---|---|---|---|---|
| 11,853,837 B1 * | 12/2023 | Malik | | H04W 4/80 |
| 2012/0212333 A1 * | 8/2012 | Rork | | G06Q 10/087 |
| | | | | 340/438 |
| 2013/0021175 A1 * | 1/2013 | Harmon | | G06Q 10/08 |
| | | | | 340/990 |
| 2013/0135082 A1 * | 5/2013 | Xian | | G06Q 10/06 |
| | | | | 340/10.1 |
| 2015/0161425 A1 * | 6/2015 | Atherton | | G07C 5/008 |
| | | | | 340/10.1 |
| 2016/0291127 A1 * | 10/2016 | Huang | | G01S 5/10 |
| 2018/0025603 A1 * | 1/2018 | Tyler | | H04W 52/0212 |
| | | | | 340/572.1 |
| 2018/0336379 A1 * | 11/2018 | Reynolds | | B60R 99/00 |
| 2021/0027028 A1 * | 1/2021 | Corser | | E06B 11/00 |
| 2021/0150159 A1 * | 5/2021 | Volkerink | | G06K 19/07758 |
| 2023/0286414 A1 * | 9/2023 | Malik | | H04W 52/0254 |
| 2023/0291210 A1 * | 9/2023 | Malik | | G06Q 10/20 |
| 2023/0292235 A1 * | 9/2023 | Malik | | H04W 52/0206 |

* cited by examiner

*Primary Examiner* — Talia F Crawley
(74) *Attorney, Agent, or Firm* — Grüneberg and Myers PLLC

(57) ABSTRACT

A system includes one or more assets loaded onto or removed from a vehicle, where each asset is coupled to a wireless tag and each wireless tag wirelessly transmits beacon signals at predetermined intervals. The system includes a gateway disposed within the vehicle. The gateway includes one or more sensors that gather motion and/or vibration information. The gateway scans an area of the vehicle at a duty cycle to identify beacon signals transmitted by the wireless tags and receives the beacon signals from the wireless tags. The gateway dynamically adjusts the duty cycle based in part on the detected motion and/or vibration information and a history of previously detected motion and/or vibration information.

19 Claims, 4 Drawing Sheets

SYSTEMS AND METHODS FOR HISTORICAL MOTION AND/OR VIBRATION DETECTION IN VEHICLE GATEWAYS

BACKGROUND OF THE INVENTION

Field of the Invention

The present disclosure relates generally to the field of asset management, and more particularly to systems and methods for adjusting operation parameters of a vehicle gateway based on a history of motion and/or vibration activity within the vehicle.

Description of Related Art

Various assets, such as corded and cordless power tools, may be useful on a typical construction jobsite. These assets may include tools such as drill machines, saws, hammers, grinders and sanders, vacuum cleaners, drivers, measuring tools, and/or other types of tools and tool accessories. Often, assets are moved between locations (e.g., a construction jobsite, a warehouse, a container, etc.) by different groups of people. Assets are typically valuable resources, and it is beneficial to track the status of a particular asset in order to improve the overall efficiency of the jobsite. Accordingly, various systems and methods may be utilized to track the location and/or the real-time status of a particular asset within a fleet of tools owned by a particular entity. In particular, assets may be tracked with tags that periodically beacon information to a remote gateway. One or more gateways may continuously and/or periodically scan for beacon signals from tags within the vicinity and may send information received from a tag to a remote asset management system. In certain situations, a gateway may utilize large amounts of power to function continuously and/or periodically.

Accordingly, it is beneficial to provide for systems and methods for reducing the power consumption of a gateway by dynamically adjusting operating parameters of the gateway based on motion and/or vibration activity. In particular, it is beneficial to adjust the operating parameters of a vehicle gateway based on detected motion and/or activity in a mobile environment.

SUMMARY OF THE INVENTION

Certain embodiments commensurate in scope with the originally described subject matter are summarized below. These embodiments are not intended to limit the scope of the described subject matter, but rather these embodiments are intended only to provide a brief summary of possible forms of the subject matter. Indeed, the subject matter may encompass a variety of forms that may be similar to or different from the embodiments set forth below.

In a first embodiment, a system includes one or more assets loaded onto or removed from a vehicle, where each asset is coupled to a wireless tag and each wireless tag wirelessly transmits beacon signals at predetermined intervals. The system includes a gateway disposed within the vehicle. The gateway includes one or more sensors that gather motion and/or vibration information. The gateway scans an area of the vehicle at a duty cycle to identify beacon signals transmitted by the wireless tags and receives the beacon signals from the wireless tags. The gateway dynamically adjusts the duty cycle based in part on the detected motion and/or vibration information and a history of previously detected motion and/or vibration information.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Figure 1:
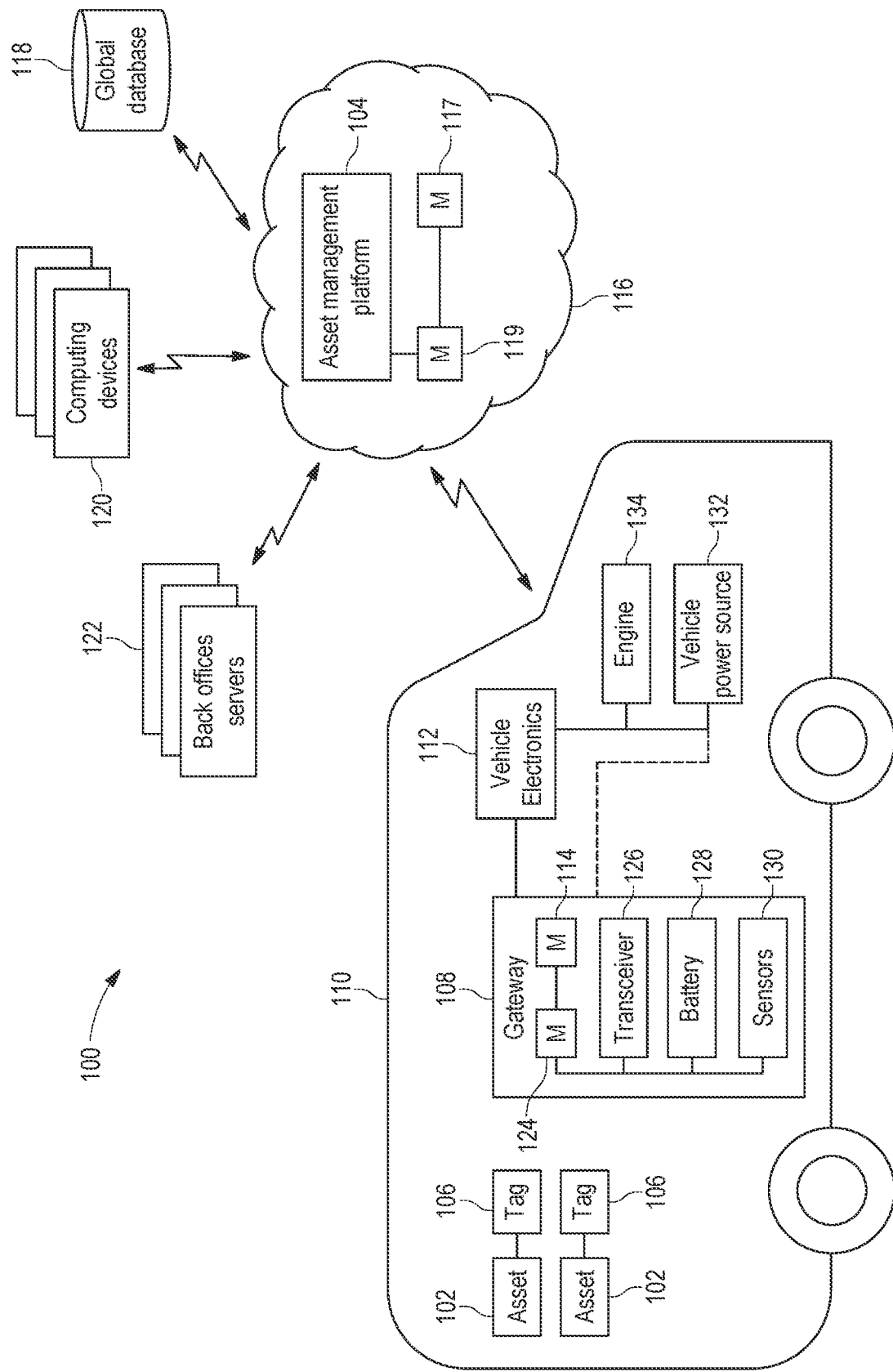
FIG. 1 is a block diagram of an embodiment of an asset management system having a gateway disposed within a vehicle, where the gateway includes one or more sensors.

Turning now to the drawings, FIG. 1 is an asset management system 100 having a plurality of assets 102 that are tracked with a remote asset management platform 104. Each asset 102 may be removably and communicatively coupled to a wireless tag 106. The wireless tags 106 may be active or passive tags that are configured to wirelessly transmit and receive information to/from a gateway 108. In certain embodiments, the assets 102 and wireless tags 106 may be loaded onto and/or removed from a vehicle 110, and the gateway 108 is a vehicle gateway that may be disposed within the vehicle 110. In certain embodiments, the gateway 108 may be fixed or mounted inside the vehicle 110, and communicatively coupled to the vehicle electronics 112. In certain embodiments, the vehicle gateway 108 may be associated with the vehicle 110. An infrastructure of connected devices (e.g., the gateways 108 and/or other computing devices) may gather data from the wireless tags 106, and wirelessly transmit this information to the asset management platform 104. The asset management platform 104 may be a cloud-based service that collects information from the gateways 108 to track and inventory the assets 102.

The plurality of assets 102 may be owned or managed by a single entity (e.g., a corporation, an individual, an organization, etc.) or by several entities. For example, assets may include tools such as power tools (e.g., rotary hammers, drives, screw drivers, saws, grinders, etc.), drill machines, vacuum cleaners and accessories, measuring tools (e.g., detection tools, lasers, layout tools, surveying equipment, etc.), direct fastening tools, diamond cutting and drilling tools, tool accessories (e.g., tool boxes, kits, computing devices, etc.), and/or other types of tools and tool accessories that may be utilized within the construction industry. While the construction industry is utilized as an exemplary embodiment, it should be noted that the present embodiments may be applicable in other industries. In certain embodiments, assets may include any product, resource, or accessory utilized in an industrial setting that may be a valuable resource owned by the entity. For example, the present embodiments may be utilized to track and inventory assets in the manufacturing, energy, agriculture, transportation and logistics, or services industries. Assets in such industries may include, for example, shipping equipment, machinery, vehicles, telecommunications equipment, hardware, or any resource that may be of interest for an entity.

In certain embodiments, the asset 102 may be removably attached and initially registered/assigned to the wireless tag 106. Wireless tags 120 may be active or passive tags that are configured to wirelessly transmit and receive information to/from a computing device, such as the gateway 108, smartphone, computer, tablet, etc. The association between the wireless tag 106 and the asset 102 may be stored within the remote asset management platform 104. In certain embodiments, the registration and assigning process may be processed by the manufacturer and/or by the entity who acquires the asset. In certain embodiments, the entity may purchase or acquire an asset already attached, registered, and assigned to the wireless tag. The process of registering a tag with a particular asset may be done with any application and computing device that can identify tags and assets. In certain embodiments, tags may be removed and replaced, so that a damaged tag may be replaced, reused on a different asset, or discarded. Additionally, tags may be re-registered with a different asset, and the new association between the tag and the new asset may be stored within the remote asset management platform 104.

In certain embodiments, the tags 106 may be removably attached to an external surface of the assets 102, or they may be attached to an accessory associated with the assets 102, such as a tool case or container. In certain embodiments, the tags 106 may be mechanically attached to the assets 102 via any attachment means (e.g., adhesive, tape, snap-on, magnet features, screws, nails, press-fit feature, etc.). In certain embodiments, the tags 106 may be disposed within a cavity located on an external surface of the assets 102. In certain embodiments, the tags 106 may be disposed within a housing of the asset 102. In particular, the wireless tags 106 may be enabled to transmit and receive information to/from the gateway 108 via one or more different wireless modes of operation, such as, but not limited to, any form of radio waves, Bluetooth, Near Field Communication (NFC), Wifi, ZigBee, LoRa, LoRaWAN, Sigfox, or any wireless transmission. In certain embodiments, the tags 106 may be configured to continuously transmit beacon signals at predetermined intervals of time (e.g., 5 seconds, 10 seconds, 15 seconds, 20 seconds, 1 minute, 5 minutes, 10 minutes, 20 minutes, 1 hour, 2 hours, 3 hours, 5 hours, 1 day, 2 days, or any interval that may be suitable to preserve battery life without compromising asset tracking).

In certain embodiments, the assets 102 and the associated wireless tags 106 that are brought within and/or removed from the proximity of the gateway 108 are tracked and recorded, and this information is transmitted to the asset management platform 104. In certain embodiments, the gateway 108 may be fixed or mounted inside the vehicle 110. In certain embodiments, the gateway 108 may be communicatively coupled to the vehicle electronics 112. The gateway 108 may be assigned or preassigned to the vehicle as a logical location within the asset management platform 104. Further, the gateway 108 may be configured to monitor and record the activity of the assets 102 proximate to the gateway 108 by scanning for and receiving beacon signals emitted by the wireless tags 106. For example, as assets 102 are loaded to the vehicle 110, stored or transported within the vehicle 110, and/or removed from the vehicle 110, the wireless tags 106 associated with the assets 102 continue to emit beacon signals. The gateway 108 is configured to receive the beacon signals, record the activity as an event, and store the activity within a memory 114 of the gateway 108. In certain embodiments, the gateway 108 acknowledges the beacon signal with an acknowledgment signal. In certain embodiments, the event may include a time-stamp, operating parameters of the asset 102, status information, unique identification information of the asset and/or battery, state of health (SOH) or state of charge (SOC) of the battery associated with the asset 102, or any other information that may be relevant to the asset or the status of the asset 102.

In certain embodiments, the gateway 108 may include a processor 124, a memory 114, a transceiver 126, an internal battery 128, and sensors 130. In certain embodiments, the gateway 108 may include one or more sensors 130, such as, for example, an accelerometer, a gyroscope, a magnetometer, a motion sensor, a proximity sensor, a position and/or orientation sensor, a temperature sensor, an infrared sensor, an ultrasonic sensor, a light sensor, a force and/or vibration sensor, or any type of sensor that can provide information related to the vehicle 110, the engine 134, the gateway 108, and/or the assets 102. The sensors 130 may be configured to gather and transmit information related to the vehicle 110, the engine 134, the gateway 108, and/or the assets 102 to the processor 124. In certain embodiments, the processor 124 may utilize the information from the sensors 130 to determine one or more environmental conditions of the vehicle 110, the engine 134, the gateway 108, and/or the assets 102, as further described in detail with respect to FIGS. 3 and 4. Further, based on the information received from the sensors 130, the processor 124 may be configured to adjust the operating parameters of the gateway 108, as further described in detail with respect to FIGS. 3 and 4.

In certain embodiments, the gateway 108 may be configured to transmit the information to the asset management platform 104. In certain embodiments, the gateway 108 may be configured to receive and process the beacon signals and the information from the sensors 130, and transmit the information to the asset management platform 104 via WiFi (e.g., Institute of Electrical and Electronics Engineers [IEEE] 802.11X, cellular conduits (e.g., high speed packet access [HSPA], HSPA+, long term evolution [LTE], WiMax) and the like. In certain embodiments, the asset management platform 104 records and analyzes information received from one or more gateways 108 (and/or other computing devices), to provide real-time information about the physical location of a particular asset 102. The asset management platform 104 may be configured to record the event associated with the asset 102 and maintain a historical record of events for the asset 102. Accordingly, based on sensor information, the asset management platform 104 may be configured to determine whether the asset 102 has been loaded, unloaded, or transported/stored within the vehicle 110.

In certain embodiments, the memory 114 of the gateway 108 may be configured to store activity and/or events of the assets 102, and may store instructions or logic executable by the processor 124. In certain embodiments, the transceiver 126 may transmit the information to the asset management platform 104 via one or more different wireless protocols, as described in detail above. In certain embodiments, the gateway 108 includes an internal power source (such as an internal battery 128) that is utilized when an external power source (such as a vehicle power source 132) is not available. In certain embodiments, the gateway 108 may receive power directly from a vehicle power source 132, such as a 12V charger port, an OBD port, or a similar direct connection to the vehicle 110. In certain embodiments, the gateway 108 may be connected via the vehicle electronics 112, and may receive power from the vehicle power source 132 (e.g., vehicle battery) when the vehicle engine 134 is turned "ON." When the vehicle engine 134 is turned "OFF," the gateway 108 is disconnected from the vehicle power source 132, and switches to the internal battery 128 (e.g., rechargeable battery) for power.

The cloud-based computing device 116 may be a service provider providing cloud analytics, cloud-based collaboration and workflow systems, distributed computing systems, expert systems and/or knowledge-based systems. The cloud-based computing device 116 may include a memory 117 and a processor 119. In certain embodiments, the cloud-based computing device 116 may be a data repository that is coupled to an internal or external global database 118. Further, in certain embodiments, the global database 118 may allow computing devices 120 to retrieve information stored within for additional processing or analysis. Indeed, the cloud-based computing device may be accessed by a plurality of systems (computing devices 120 and/or computing devices from back offices/servers 122) from any geographic location, including geographic locations remote from the physical locations of the systems. Accordingly, the cloud 116 may enable advanced collaboration methods between parties in multiple geographic areas, provide multi-party workflows, data gathering, and data analysis, which may increase the efficiency of remotely tracking and keeping an inventory of assets owned by a particular entity in real-time.

In certain embodiments, when the gateway 108 is coupled to the vehicle power source 132, the gateway 108 may continuously scan for beacon signals from the wireless tags 106. However, when the gateway 108 is utilizing the internal battery 128, continuous scanning may drain the battery and reduce the efficiency or accuracy of gateway scanning. Accordingly, the present embodiments describe systems and methods for adjusting the operating parameters of the gateway 108 based on one or more environmental conditions of the vehicle 110, the engine 134, the gateway 108, and/or the assets 102, as further described in detail with respect to FIGS. 3 and 4. Specifically, the scanning frequency of the gateway 108 may be adjusted based on information received from the sensors 130 on the motion and/or activity of the vehicle 110, the engine 134, the gateway 108, and/or the assets 102, as further described in detail with respect to FIGS. 3 and 4.

Figure 2:
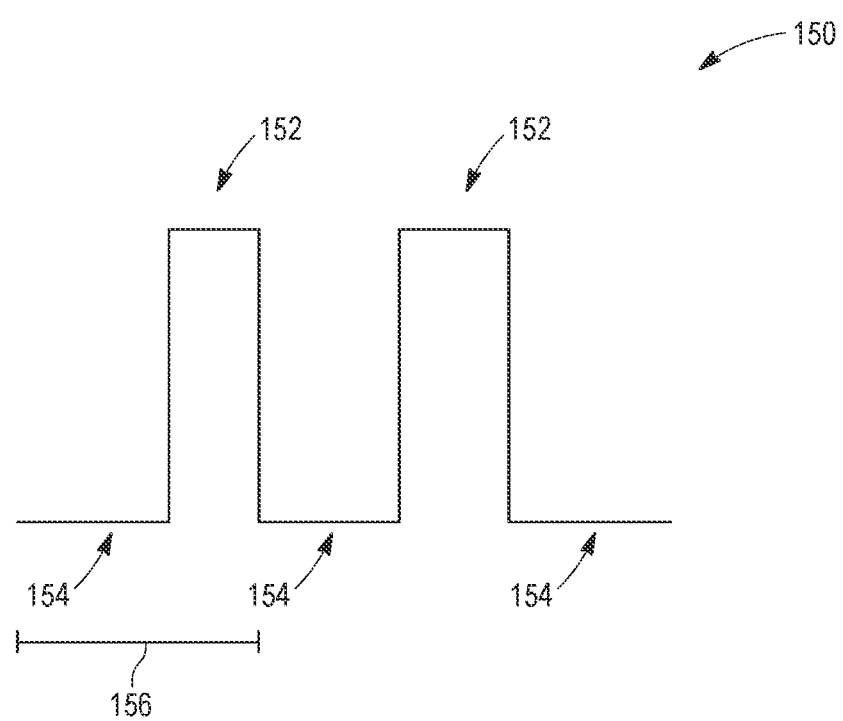
FIG. 2 is a schematic of an embodiment of the gateway of FIG. 1 operating in a low power mode operation, where a duty cycle includes alternating active and inactive periods.

FIG. 2 is a schematic of an embodiment of the gateway 108 of FIG. 1 operating in a low power mode, where a duty cycle 150 of the gateway 108 includes alternating active periods 152 and inactive periods 154. The duty cycle 150 of the gateway 108 may be described as the fraction of time the gateway 108 is actively scanning for beacon signals over the total duration of time the gateway 108 is operational. In other words, the duty cycle 150 is the active period 152 over the total duration 156. The duty cycle 150 may be set and/or adjusted based on operating parameters of the gateway 108 or motion/activity of the vehicle 110, the engine 134, the gateway 108, and/or the assets 102. For example, the duty cycle 150 of the gateway 108 may be adjusted based on whether the vehicle 110 is stationary or moving (or previously stationary or previously moving), the status of the assets 102 being loaded or unloaded on the vehicle 110, and/or other motion/activity/vibration data gathered from the sensors 130, as further described in detail below.

As noted above, in certain embodiments, the gateway 108 may be configured to continuously scan for beacon signals from wireless tags 106 when the gateway 108 receives power from the vehicle power source 132. In other words, when an external power source is available, the gateway 108 may operate in a high duty cycle where the gateway 108 actively scans for beacon signals from its vicinity. In certain embodiments, the gateway 108 may be configured to dynamically adjust the duty cycle 150 based on one or more operational parameters or environmental conditions (e.g., motion/activity surrounding the gateway 108). Specifically, the gateway 108 may switch from a high duty cycle (where the gateway 108 is operating in a high power mode, continuously scanning for beacon signals, and/or continuously transmitting information to the asset management platform 104) to a low duty cycle (where the gateway 108 is operating in a low power mode and modifies the duty cycle 150 to adjust the duration of the active period 152).

For example, in certain embodiments, the gateway 108 may operate in the low power mode by decreasing the active period 152 (e.g., 10 minutes, 9 minutes, 8 minutes, 7 minutes, 6 minutes, 5 minutes, or less) every hour or more that the gateway 108 is operational. In certain embodiments, the gateway 108 may operate in the low power mode by keeping the active period 152 fixed (e.g., 5 mins) and increasing the inactive period 154 (e.g., 0, 5 mins, 10 mins, 20 mins, etc.). As another example, in certain embodiments, the gateway 108 may operate in the high power mode by increasing the active period 152 (e.g., 30 minutes, 40 minutes, 50 minutes, or more) every hour or more than the gateway 108 is operational. In certain embodiments gateway 108 may operate in the high power mode by keeping the active period 152 fixed (e.g., 5 mins) and decreasing the inactive period 154 (e.g., 20 mins, 10 mins, 5 mins, 0 min etc.).

Figure 3:
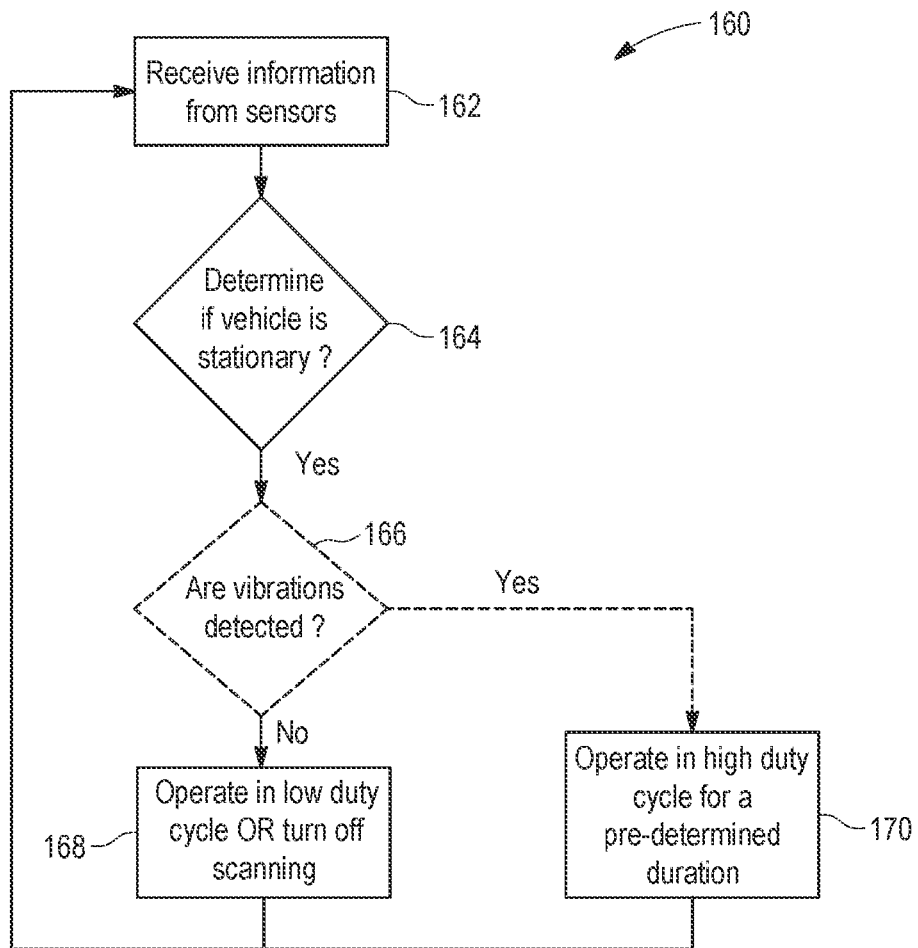
FIG. 3 is a flow chart of an embodiment of the gateway of FIG. 1, where the gateway adjusts the duty cycle based on motion and/or vibration information received from the one or more sensors.
Figure 4:
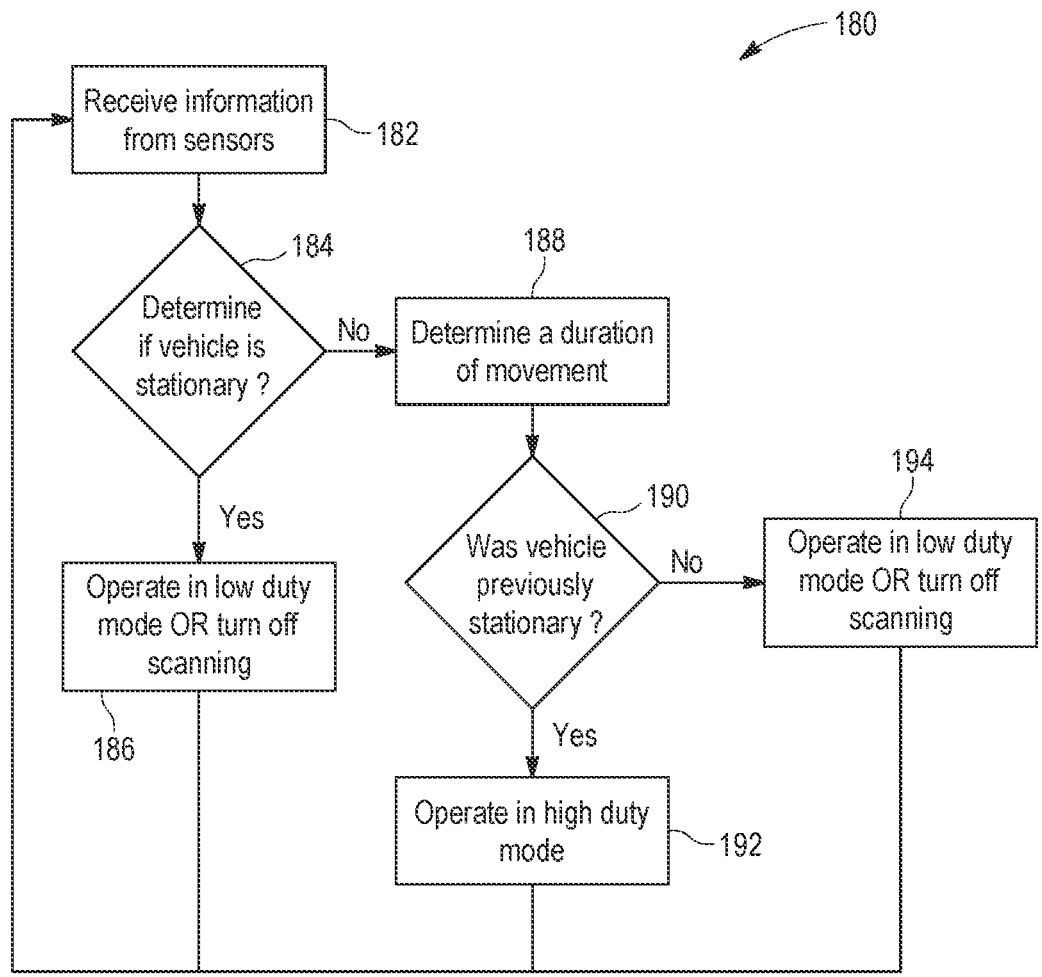
FIG. 4 is a flow chart of an embodiment of the gateway of FIG. 1, where the gateway adjusts the duty cycle based on information received from the one or more sensors and a history of previous motion and/or vibration activity.

In particular, the processor 124 may be configured to dynamically adjust the duty cycle 150 based on feedback received from the one or more sensors 130, as further described in detail with respect to FIGS. 3 and 4.

FIG. 3 is a flow chart 160 of an embodiment of the gateway 108 of FIG. 1, where the gateway 108 dynamically adjusts the duty cycle 150 based on motion and/or vibration information received from the one or more sensors 130. In certain embodiments, the gateway 108 may be configured to receive information from the one or more sensors 130 (block 162), and may utilize the information to adjust the duty cycle 150 of the gateway 108. Specifically, the motion and/or vibrations detected around the gateway 108 may indicate the activity occurring in and around the vehicle 110. For example, when the vehicle 110 is stationary or moving, the status of the assets 102 within the vehicle 110 may not change. Therefore, the gateway 108 may be configured to operate in a low duty cycle. As a further example, when motion and/or vibration is detected (e.g., assets 102 are loaded/unloaded from the vehicle 110), the status of the assets 102 within the vehicle 110 may change. Therefore, the gateway 108 may be configured to operate in a high duty cycle.

In certain embodiments, the sensors 130 may be configured to gather motion and/or activity information related to the vehicle 110, the engine 134, the gateway 108 and/or the assets 102. The sensors 130 may be an accelerometer, a gyroscope, a magnetometer, a motion sensor, a proximity sensor, a position and/or orientation sensor, a temperature sensor, an infrared sensor, an ultrasonic sensor, a light sensor, a force and/or vibration sensor, or any type of sensor that can provide information related to the vehicle 110, the engine 134, the gateway 108, and/or the assets 102. In certain embodiments, the gateway 108 may be configured to receive information gathered by the sensors 130 and utilize the information to determine if the vehicle 110 is stationary (block 164). A stationary vehicle may be a parked vehicle 110 that may have one or more assets 102 on the vehicle 110. In certain embodiments, the gateway 108 may be configured to operate in a low duty cycle for a stationary vehicle 110 that is parked in a particular location (block 168). For example, in a low power mode operating with a low duty cycle, the gateway 108 may be configured to utilize the minimum amount of power needed to accurately scan the assets 102. Further, in a low power mode, the gateway 108 may be configured to set the inactivity period 154 to a maximum inactivity threshold, in order to maximize power savings without compromising the accuracy of the tracking of assets 102 within the vehicle 110. In certain embodiments, the gateway 108 may operate in a deep sleep mode and turns off all scanning or transmission of information to the asset management platform 104. While the gateway 108 is a low power mode, the gateway 108 may continue to receive information from the sensors 130.

In certain embodiments, the gateway 108 continues to receive information from the sensors 130 and continues to monitor motion and/or activity information. In certain embodiments, the gateway 108 may be configured to determine if vibrations are detected around the gateway 108, the engine 134, the gateway 108, and/or the assets 102 (block 166). For example, loading or unloading the assets 102 from the vehicle 110 may cause vibrations that are detected by the sensors 130 on the gateway 108. In certain embodiments, the gateway 108 may be configured to adjust the duty cycle 150 to operate in a high duty cycle or high power mode (block 170) when vibrations are detected. In certain embodiments, the gateway 108 may continue to operate in a high power mode with a high duty cycle for a pre-determined period of time (e.g., 10 min, 20 min, 30 min, etc.). In certain embodiments, the gateway 108 may continue to operate in a high power mode with a high duty cycle for as long as the sensors 130 continue to detect motion and/or vibration activity. For example, the gateway 108 may continue to operate in high duty mode for as long as assets 102 are loaded/unloaded from the vehicle 110.

FIG. 4 is a flow chart of an embodiment of the gateway 108 of FIG. 1, where the gateway 108 adjusts the duty cycle 150 based on information received from the one or more sensors 130 and a history of previous motion and/or vibration activity. In certain embodiments, the gateway 108 may be configured to receive information from the one or more sensors 130 (block 182) and utilize the information to determine if the vehicle 110 is stationary (block 184). A stationary vehicle may be a parked vehicle 110 that may have one or more assets 102 on the vehicle 110. In certain embodiments, the gateway 108 may be configured to operate in a low duty cycle for a stationary vehicle 110 that is parked in a particular location (block 186).

In certain embodiments, the gateway 108 may be configured to receive motion and/or vibration information from the one or more sensors 130 (block 182) and utilize the information to determine that the vehicle 110 is in motion. The gateway 108 may be configured to determine a duration of time that the vehicle 110 has been in motion (block 188), in order to determine the type of movement. For example, based on the length of time the vehicle 110 is in motion, the gateway 108 may be configured to determine if the vehicle 110 is at a routine traffic light, moving from location to location, loading or unloading the assets 102, etc.

In certain embodiments, based on the duration of movement, the gateway 108 may be configured to determine if the vehicle 110 has started to move or has already been moving for a period of time. For example, the gateway 108 may be configured to determine if the vehicle was previously stationary (block 190). If the vehicle 110 was previously stationary, the vehicle 110 has just started to move, so the gateway 108 is configured to adjust the duty cycle to a high duty cycle in order to capture any new activity related to the assets 102 (block 192). If the vehicle 110 was previously moving (i.e., not stationary), the gateway 108 may be configured to operate in a low duty mode and/or can turn off scanning (block 194). In other words, a vehicle 110 that was previously moving likely does not have any changes in the assets 102 onboard the vehicle 110. In this manner, the gateway 108 is configured to determine whether the vehicle 110 has just started to move (to operate in high power mode), or if the vehicle 110 is continuously in motion (to switch to a lower power mode).

In certain embodiments, the gateway 108 may calculate whether the duration of time that the vehicle 110 has been stationary is less than a pre-determined threshold of time (e.g., 30 seconds, 45 seconds, 1 minute, 2 minutes, etc.). If the duration of time the vehicle 110 is stationary is less than the pre-determined threshold of time, the gateway 108 may determine the type of motion as a traffic stop or a momentary pause of a continuously moving vehicle 110. In this manner, the gateway 110 may be configured to distinguish between different types of motion and/or vibration activity in order to determine when high or low power modes should be utilized.

This written description uses examples to disclose the invention, including the best mode, and also to enable any person skilled in the art to practice the invention, including making and using any devices or systems and performing any incorporated methods. The patentable scope of the invention is defined by the description, and may include other examples that occur to those skilled in the art. Such other examples are intended to be within the scope of the description if they have structural elements that do not differ from the literal language of the description, or if they include equivalent structural elements with insubstantial differences from the literal language of the description.

What is claimed:

1. A system, for monitoring assets within a vehicle, the system comprising:

one or more assets loaded onto or removed from a vehicle, each asset coupled to a wireless tag configured to wirelessly transmit beacon signals at predetermined intervals; and a gateway device disposed within the vehicle, the gateway comprising:

one or more motion and/or vibration sensors configured to detect motion and/or vibration information of the vehicle;

a processor configured to execute instructions stored in a memory to:

scan an area within the vehicle at a duty cycle to identify beacon signals transmitted by the wireless tags;

receive the beacon signals from the wireless tags;

analyze the detected motion and/or vibration information from the one or more motion and/or vibration sensors to determine a current state of the vehicle, including stationary or moving;

retrieve from the memory a history of previously detected motion and/or vibration information;

dynamically adjust the duty cycle of the scanning based the current state of the vehicle and the retrieved history of previously detected motion and/or vibration information, wherein adjusting the duty cycle comprises;

increasing a frequency of scanning of the beacon signals transmitted by the wireless tags upon detecting that the vehicle is in the moving state and was previously in the stationary state, based the retrieved history of the previously detected motion and/or vibration information, decreasing or turning off a frequency of scanning of the beacon signals transmitted by the wireless tags upon detecting that the vehicle is in the stationary state or that the vehicle is in the moving state and was previously in the moving state, based the retrieved history of the previously detected motion and/or vibration information.

2. The system of claim 1, wherein the memory of the gateway comprises the history of the previously detected motion and/or the vibration information.

3. The system of claim 1, wherein the gateway is configured to determine whether the one or more assets are loaded onto or removed from the vehicle based in part on the motion and/or vibration information.

4. The system of claim 3, wherein the gateway is configured to scan at a high duty cycle when the gateway detects that the one or more assets are loaded onto or removed from the vehicle.

5. The system of claim 3, wherein the gateway is configured to scan at a low duty cycle when the gateway does not detect any of the one or more assets are loaded onto or removed from the vehicle.

6. The system of claim 1, wherein the duty cycle comprises alternating active periods and inactive periods, and wherein the gateway is scanning for the beacon signals during the active period, and wherein the gateway is not scanning for the beacon signals during the inactive period.

7. The system of claim 1, wherein the gateway optimizes the duty cycle with a gradual increase and/or decrease of an active period or a gradual increase and/or decrease of an inactive period of the duty cycle.

8. The system of claim 1, wherein the one or more sensors comprises an accelerometer, a gyroscope, a magnetometer, a motion sensor, a proximity sensor, a position and/or orientation sensor, a temperature sensor, an infrared sensor, an ultrasonic sensor, a light sensor, a force and/or vibration sensor, or any type of sensor that can gather the motion and/or vibration information.

9. The system of claim 1, wherein the gateway is configured to determine whether the vehicle is stationary or moving based in part on the motion and/or vibration information.

10. The system of claim 9, wherein the gateway is configured to scan at a low duty cycle when the gateway detects that the vehicle is stationary, and wherein the gateway is configured to switch to a high duty cycle after the gateway detects that the assets are loaded onto or removed from the vehicle based in part on the motion and/or vibration information.

11. The system of claim 9, wherein the gateway is configured to scan at a low duty cycle when the gateway detects that the vehicle is moving.

12. The system of claim 1, wherein the gateway is configured to determine whether the vehicle was previously stationary or previously moving based on the history of the previously detected motion and/or vibration information.

13. The system of claim 12, wherein the gateway is configured to scan at a high duty cycle if the gateway determines that the vehicle is currently moving after being previously stationary.

14. The system of claim 12, wherein the gateway is configured to scan at a low duty cycle if the gateway determines that the vehicle is currently moving after previously moving.

15. The system of claim 12, wherein the gateway is configured to scan at a high duty cycle if the gateway determines that the vehicle was previously moving and currently stationary.

16. The system of claim 1, wherein the gateway is configured to calculate a duration of time that the vehicle is stationary or moving based on the detected motion and/or vibration information and a history of previously detected motion and/or vibration information.

17. The system of claim 16, wherein the gateway is configured to scan at a low duty cycle if the duration of time that the vehicle is stationary is less than a threshold duration of time.

18. The system of claim 16, wherein the gateway is configured to scan at a high duty cycle if the duration of time that the vehicle is stationary is greater than a threshold duration of time.

19. The system of claim 18, wherein the gateway is configured to switch to a low duty cycle from the high duty cycle if the duration of time the vehicle is stationary is greater than the threshold duration of time but the gateway does not detect any motion or vibration for a second duration of time.

* * * * *